(12) United States Patent
Galil

(10) Patent No.: US 8,447,132 B1
(45) Date of Patent: May 21, 2013

(54) DYNAMIC RANGE CORRECTION BASED ON IMAGE CONTENT

(75) Inventor: Erez Galil, Mountain View, CA (US)

(73) Assignee: CSR Technology, Inc., Sunnyvale, CA (US)

( * ) Notice: Subject to any disclaimer, the term of this patent is extended or adjusted under 35 U.S.C. 154(b) by 254 days.

(21) Appl. No.: 12/961,400

(22) Filed: Dec. 6, 2010

Related U.S. Application Data

(60) Provisional application No. 61/285,063, filed on Dec. 9, 2009.

(51) Int. Cl.
*G06K 9/40* (2006.01)
*H04N 1/60* (2006.01)

(52) U.S. Cl.
USPC .......................................... 382/274; 358/1.9

(58) Field of Classification Search
USPC ................. 382/118, 243, 254, 264, 266, 274, 382/305, 312, 275; 348/207.99, 241, 345; 358/1.9, 3.27, 518, 520; 345/617
See application file for complete search history.

(56) References Cited

U.S. PATENT DOCUMENTS

| | | | |
|---|---|---|---|
| 4,466,018 A | 8/1984 | Soneda et al. | |
| 5,012,333 A | 4/1991 | Lee et al. | |
| 6,788,822 B1 | 9/2004 | Zhang et al. | |
| 6,807,299 B2 | 10/2004 | Sobol | |
| 6,822,762 B2 | 11/2004 | Moroney et al. | |
| 6,862,373 B2 | 3/2005 | Enomoto | |
| 6,975,418 B1 | 12/2005 | Ohta et al. | |
| 6,982,811 B2 | 1/2006 | Sato | |
| 7,088,388 B2 | 8/2006 | MacLean et al. | |
| 7,158,686 B2 | 1/2007 | Gindele | |
| 7,269,292 B2 * | 9/2007 | Steinberg | 382/243 |
| 7,321,112 B2 | 1/2008 | Stam et al. | |
| 7,358,502 B1 | 4/2008 | Appleby et al. | |
| 7,382,928 B2 * | 6/2008 | Wong et al. | 382/254 |
| 7,469,072 B2 | 12/2008 | Yano | |
| 7,580,566 B2 | 8/2009 | Fukuda et al. | |
| 7,650,045 B2 | 1/2010 | Yano | |
| 7,899,267 B2 | 3/2011 | Dvir | |
| 7,948,524 B2 * | 5/2011 | Endo et al. | 348/222.1 |
| 8,081,239 B2 * | 12/2011 | Zhang et al. | 348/241 |

(Continued)

FOREIGN PATENT DOCUMENTS

JP 2006018739 1/2006
JP 2007325145 12/2007

OTHER PUBLICATIONS

Boult, "Correcting Chromatic Aberrations Using Image Warping," *Center for Research in Intelligent Systems, Columbia University, Department of Computer Science*, 1992, 15 pages.

(Continued)

*Primary Examiner* — Kanjibhai Patel
(74) *Attorney, Agent, or Firm* — Perkins Coie LLP

(57) ABSTRACT

Disclosed are method and a corresponding apparatus, where the method according to one embodiment includes making a determination that a first portion of digital image data represents a physical object of a predetermined type, determining an amount of a parameter, such as a gain, to apply to the first portion of the digital image data, based on the determination that the first portion of the digital image data represents a physical object of the predetermined type, and applying the determined amount of the parameter to the first portion of the digital image data. The method may be part of a dynamic range correction operation.

33 Claims, 13 Drawing Sheets

U.S. PATENT DOCUMENTS

| | | | |
|---|---|---|---|
| 8,115,836 B2* | 2/2012 | Miyahara et al. | 348/254 |
| 8,175,343 B2* | 5/2012 | Tezuka | 382/118 |
| 8,259,214 B2* | 9/2012 | Ishii | 348/345 |
| 2002/0181801 A1 | 12/2002 | Needham et al. | |
| 2003/0038957 A1 | 2/2003 | Sharman | |
| 2004/0150732 A1 | 8/2004 | Yamanaka | |
| 2004/0227978 A1 | 11/2004 | Enomoto | |
| 2005/0265626 A1 | 12/2005 | Endo et al. | |
| 2006/0062562 A1 | 3/2006 | Utagawa | |
| 2007/0147701 A1 | 6/2007 | Tanaka | |
| 2008/0291287 A1 | 11/2008 | Dvir | |
| 2008/0292206 A1 | 11/2008 | Dvir | |
| 2009/0161964 A1 | 6/2009 | Tzur et al. | |
| 2009/0179998 A1 | 7/2009 | Steinberg et al. | |
| 2009/0220148 A1 | 9/2009 | Levy et al. | |
| 2009/0290807 A1* | 11/2009 | Marchesotti | 382/261 |
| 2010/0014775 A1 | 1/2010 | Ikeda | |
| 2010/0034458 A1 | 2/2010 | Tada | |
| 2010/0079617 A1 | 4/2010 | Kosaka | |

OTHER PUBLICATIONS

Boult, Local Image Reconstruction and Sub-Pixel Restoration Algorithms, *Graphical Models and Image Processing*, vol. 55(1), Jan. 1993, pp. 1-12.

Choudhury, et al., "The Trilateral Filter for High Contrast Images and Meshes," *Eurographics Symposium on Rendering*, 2003, pp. 1-11.

Duran, et al., "Fast Bilateral Filtering for the Display of High-Dynamic Range Images," *ACM Transactions on Graphics, Special issue on Proc. of ACM Sig-Graph*, 2002, San Antonio, Texas, vol. 21(3), pp. 267-266.

Fattal, et al., "Gradient Domain High Dynamic Range Compression," *ACM Transactions on Graphics, Special Issue on Proc. of ACM Sign-Graph*, 2002, San Antonio, Texas vol. 21(3), pp. 249-256.

Gilboa, et al., "Complex Diffusion Processes for Image Filtering," *Proc. Conf. Scale-Space*, 2001, pp. 299-307.

Perona, et al., "Scale-Space and Edge Detection Using Anisotropic Diffusion," *University of California Berkeley*, Dec. 20, 1988, pp. 1-30.

Tomasi, et al., "Bilateral Filtering of Gray and Color Images," Proc, IEEE Intl. Conference on Computer Vision, 1998, pp. 839-846.

Wong, "Image Enhancement by Edge-Preserving Filtering," *First IEEE International Conference on Imaging Processing*, Austin, Texas, Nov. 13-16, 1994, 6 pages.

Yamashita, et al., "Contrast-Gain-Based Visual Tone Mapping for Digital Photo Prints," Journal of Imaging Science and Technology, vol. 60(5), pp. 468-468 (2006).

Co-pending U.S. Appl. No. 11/762,797, filed May 23, 2007.

Notice of Allowance Mailed Oct. 5, 2010 in Co-Pending U.S. Appl. No. 11/752,797, filed May 23, 2007.

* cited by examiner

US 8,447,132 B1

DYNAMIC RANGE CORRECTION BASED ON IMAGE CONTENT

This application claims the benefit of U.S. Provisional Patent Application No. 61/285,063, filed on Dec. 9, 2009, which is incorporated herein by reference.

FIELD OF THE INVENTION

At least one embodiment of the present invention pertains to dynamic range correction of digital image data, and more particularly, to a technique for dynamic range correction of digital image data based on image content.

BACKGROUND

Related Art

Most digital images encode only a small fraction of the intensities that a person can see in a real scene. Detail visible to the human eye tends to be lost in dark and bright portions of an image due to the limited dynamic range of the image sensor and/or the display device. For example, current image sensors provide contrast ratios in the range of 200:1, i.e., a dynamic range of about 46 dB, whereas the human visual cortex has a dynamic range approaching 80 dB.

Dynamic range limitations are particularly notable in digital cameras (both still and video). Consider the situation of taking a digital picture of a person standing in a dark portion of a room with a bright open window in the background. In this situation the image sensor may not be able to acquire both the details of the bright view coming through the window and the details of the person's face. In situations like this, it is desirable to compensate for the lack of sufficient dynamic range. Conventionally this is done by adjusting the exposure time and/or employing dynamic range compression/enhancement methods. However, these methods, while providing some improvement, still tend to produce images that lack details which are important to the end user.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
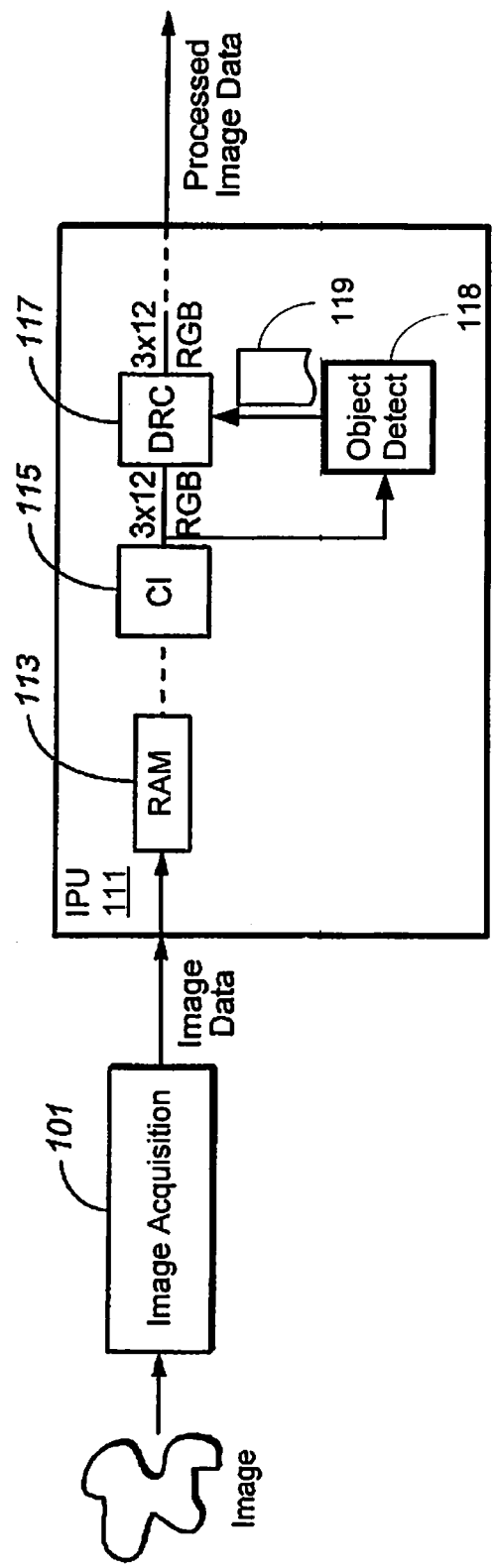
FIG. 1 is a block diagram of an imaging system in which the dynamic range correction (DRC) techniques introduced here can be implemented.

The technique introduced here identifies important content in an image, such as faces. The location of the content (e.g., faces) is then used to determine the type and/or amount of an adjustment, such as dynamic range correction (DRC), to apply. For example, using the location of a dark face to determine the exposure time, the exposure can be adjusted so that the face is bright and visible. Another example is adjusting dynamic range compression parameters so that a gain applied to a face is increased digitally. In that case, the face can be made bright and visible without causing loss of information in the bright areas of the image (saturation).

Faces are often an important type of physical object to detect when depicted in an image and are therefore discussed here, only for purposes of illustration, when explaining the DRC technique introduced here. However, the technique introduced here can be based on detecting any particular type or types of physical object depicted in an image, not just faces (and not necessarily even including faces). Additionally, the resulting adjustment can be of any image-related parameter or parameters.

The term "physical object" as used herein is to be understood in contrast with non-physical, virtual or abstract objects and concepts, such as pixels, data, and image characteristics and parameters. A physical object is something that exists in the real (physical) world and which can be visually recognized as such by a human being when depicted in a digital image. Techniques for detecting faces and other arbitrary objects and patterns in an image are known in the art and are therefore not described in detail herein.

Hence, the technique introduced here includes a method and apparatus for dynamic range correction based on image content. Known prior techniques of dynamic range correction do not take into consideration or use the content of an image, at least to the extent such content has semantic significance (meaning) to a human viewer. For example, such methods do not consider or apply the principle that showing the details of certain types of objects depicted in an image often should have higher priority than the rest of the image. As a more specific example, in many instances showing the details of a person's face in the foreground of an image should be given higher priority than showing the details of a view in the background of the image. The technique introduced here considers and applies this principle in performing dynamic range correction.

Thus, the technique introduced here includes a method and a corresponding apparatus, where the method according to one embodiment includes making a determination that a first portion of digital image data represents a physical object of a predetermined type, determining an amount of a parameter such as gain to apply to the first portion of the digital image data, based on the determination that the first portion of the digital image data represents a physical object of the predetermined type, and applying the determined amount of the parameter to the first portion of the digital image data. The amount of the parameter applied to the first portion may be a different amount than that applied to the image as a whole (or at least to those parts of the image data that do not represent a physical object of the predetermined type).

In one embodiment, an image processing device includes an object detection unit which identifies and outputs the locations of predetermined types of physical objects (e.g., faces)

represented in a digital image. The locations are provided as input to a DRC unit, which, based on that input, determines the digital gain to be applied to pixels in the image. For normal (e.g., non-face) image data, the DRC unit applies a digital gain to any given pixel depending upon whether it is part of such a specified type of object in the image. For example, a higher gain may be applied to pixels that are part of a face then for other pixels of the image.

The digital gain can be obtained or calculated from a gain lookup table. The output of the lookup table is a gain map, i.e., a two-dimensional map of gain coefficients to be applied to input pixel intensity values. In one embodiment, a single gain lookup table contains one or more values to be used for specified image content (e.g., faces) and separate values to be used for other image content, and the DRC unit selects the appropriate value for a given input pixel from the lookup table according to whether that pixel is part of a specified type of object. In another embodiment, the DRC unit uses a weighting factor (effectively, another game) to modify the gain obtained/calculated from the lookup table, according to whether the input pixel is part of a specified type of object. This in essence amounts to editing the gain map depending on the image content. In yet another embodiment, a particular gain lookup table is provided for specific image content (e.g., faces) and a separate gain look up table is provided for all other image content.

Embodiments described below employ a cascade of non-linear edge preserving filters, and nonlinear pixel point operations, to calculate pixel gain or other pixel characteristics (e.g., chromaticity) in order to make object edge detail more visible, i.e., to improve local contrast. Note, however, that other embodiments of the technique introduced here might not use cascaded filters or nonlinear pixel point operations.

The described embodiments employ a non-linear combination of a plurality of gray level images, L, of $L_n$ through $L_w$, where L is a gray image extracted from the input image, $L=\log(\max(R,G,B))$, and $L_n$ through $L_w$ are gray images obtained by applying two-dimensional low-pass filters to ascending scale regions from the narrow ($L_n$) to the wide ($L_w$) of the image. In one implementation, two low-pass filters are applied to surrounding neighborhoods of a current pixel of narrow and of wide extent. In other cases, the filter sections can be used individually. Alternatively, three or more low-pass filters can be employed in order to obtain even finer edge preserving transitions. The coefficients used to combine L with its neighbors $L_n$ through $L_w$ are automatically extracted from high-pass filtered images $H_n=L-L_n$, through $H_w=L-L_w$. Multiplying each color component of the input image by one or more pixel dependent gain or attenuation factors, using a nonlinear mapping function that may either lighten shadow regions or darken highlights or change the chromaticity of pixels in either of these regions, generates the output image. Altering input image pixel chromaticity (color balance) can be done separately, or in combination with, overall pixel gain adjustment to further enhance the appearance of image details in regions of the image close to positive (the highlight regions) or negative (the shadow regions) saturation.

Note that the content-based technique introduced here is not necessarily limited to determining a gain adjustment or to DRC. For example, other types of corrections or adjustments can be made based on image content as described herein, such as contrast enhancement, color manipulation, sharpness adjustment, noise reduction, skin smoothing, etc.

The following paragraphs include a description of the various aspects of the DRC method, flow, and apparatus. The first implementation described is a basic configuration, using just two low pass filters for the calculation cascade; more refined implementations using additional filter sections are discussed further below.

The various embodiments presented below use the current pixel in conjunction with a plurality of signals derived from one or more successively widening neighborhoods of the current pixel to refine the estimate of the enhancement gain for the current pixel. The process is preferably performed after color interpolation, that is, demosaicing of Bayer grid sensor image data when a Bayer grid format sensor is employed, so there is no need to estimate the color components of the current pixel. Rather, the near neighborhood of the current pixel may be used in the tone enhancement process to determine the pixel gain, in addition to the (at least one other) wider neighborhoods. This approach differs from at least some prior art in that it uses a cascade of widening scales, or neighborhoods, in determining the dynamic range modification to be performed, as well as in the automatic extraction of the coefficients. Although the following discussion is given in terms of a single gain factor for each pixel, more generally this can be one or more pixel dependent gain or attenuation factors or other factors, such as changing the chromaticity of pixels in either shadow regions or highlights, that can enhance the perception of image details at the extreme ends of a system's dynamic range.

FIG. 1 shows a digital imaging system, such as a digital still or video camera. The imaging system includes an image acquisition unit 101 and an Image Processing Unit (IPU) 11. An image is acquired by the image acquisition unit 101, which includes various front-end digital image acquisition elements (lens, sensor array, analog-to-digital conversion, etc.) that are well known in the art.

In the illustrated embodiment, the IPU 111 includes RAM 113, a Color Interpolation (CI) unit 115 and a DRC unit 117. The acquired image data is supplied by the image acquisition unit 101 to the IPU 111 as, for example, raw image data, or in a format such as RGB, YCbCr422, YCbCr444, or any other known or convenient format in which the data can be received in a random access memory (RAM) 113. The IPU 111 may also contain other elements which are not germane to this discussion and are therefore not illustrated.

In the illustrated embodiment, the DRC unit 117 receives a 3-color×12-bit linear RGB image constructed by the CI unit 115 (if needed). The RGB output image of the DRC unit 117, here again assumed to be a 3-color×12-bit linear RGB image, is then processed by the rest of the IPU pipeline and, typically, eventually JPEG encoded. More generally, other formats for the image data, such as 3×8 non-linear RGB, YUV, and so on, can be used. Additionally, the DRC unit 117 can be located in other locations within the image processing pipeline.

In accordance with the technique introduced here, the IPU 111 also includes an object detection unit 118. The object detection unit 118 receives the input image data (either from the CI unit 115 as shown or directly from the RAM 113) and detects the presence and locations of objects of a predetermined type or types (e.g., faces) in the input image data. The object detection unit 118 can use any known or convenient algorithm or architecture for this purpose. The object detection unit 118 generates a content map 119 as output and provides it to the DRC unit 117, which computes a digital gain for each pixel for purposes of DRC based on the content map 119. Details of how the digital gain can be computed are discussed further below.

The content map 119 in one embodiment is a two-dimensional data structure indicating the locations of any objects of the predetermined type or types in the input image data. The content map 119 can be, for example, a matrix of binary values, each corresponding to a different pixel in the input image, where a binary one (1) value indicates that the corresponding pixel is part of an object of a predetermined type and a binary zero (0) value indicates that the corresponding pixel is not part of an object of a predetermined type. In other embodiments, the content map 119 may have a greater range of possible values.

Also, in another embodiment the correction technique introduced here (including DRC unit 117 and/or object detection unit 118) could be implemented at a different stage of the pipeline than what is shown in FIG. 1. For example, the technique could instead be implemented prior to storing the image data in RAM 111, such as within or immediately after the image acquisition unit 101.

An illustrative configuration of the DRC unit 117 is schematically shown in FIG. 2. The DRC unit 117 computes a gain (or attenuation), G(s), for each sensor pixel, s=(i,j). Each color component ($C_{in}$) of the input RGB image ($R_{in}$, $G_{in}$, $B_{in}$) is multiplied by G(s) (via multiplier 208) to produce the output color component for that pixel $C_o$(s):

$$Co(s) = G(s) * Cin,$$

where C=R, G or B and in the above equation, and following discussion, '*' represents multiplication. Note that the gain determined from an L(s) in one format, such as RGB, may be applied to another image data format, such as YUV, HSV and so on. Although the illustrated embodiment uses a single G(s) for all channels at a given pixel, more generally, different factors can be used for the different channels in image data formats that have more than a single channel per pixel.

As shown in FIG. 2, the color components of the input RGB image are received at block 201, where the gray intensity image, I(s), is determined as the maximum value of the three color components of the input image pixel ($R_1$, $G_{in}$, $B_{in}$):

$$I(s) = \max(R_{in}(s), G_{in}(s), B_{in}(s)).$$

This approach differs from other methods, which use the luminance (Y) as in YCbCr, YUV, or other combination (e.g., Y=0.3R+0.6G+0.1B) and which may suffer from color saturation. Instead, the illustrated embodiment uses the max(R,G,B), which is more suitable to prevent color saturation.

In block 203, the log of I(s) is formed (for example, by use of a look-up table or other computational means) as L(s)=Log (I(s)).

L(s) then serves as the measure of the image strength that is input into block 205, where low-pass filtering and non-linear combining are performed to produce an image, F(s), where details of this process in one embodiment are described with reference to FIG. 3. The image F(s) is applied to a gain look-up table 207 to determine the gain values G(s).

Figure 7:
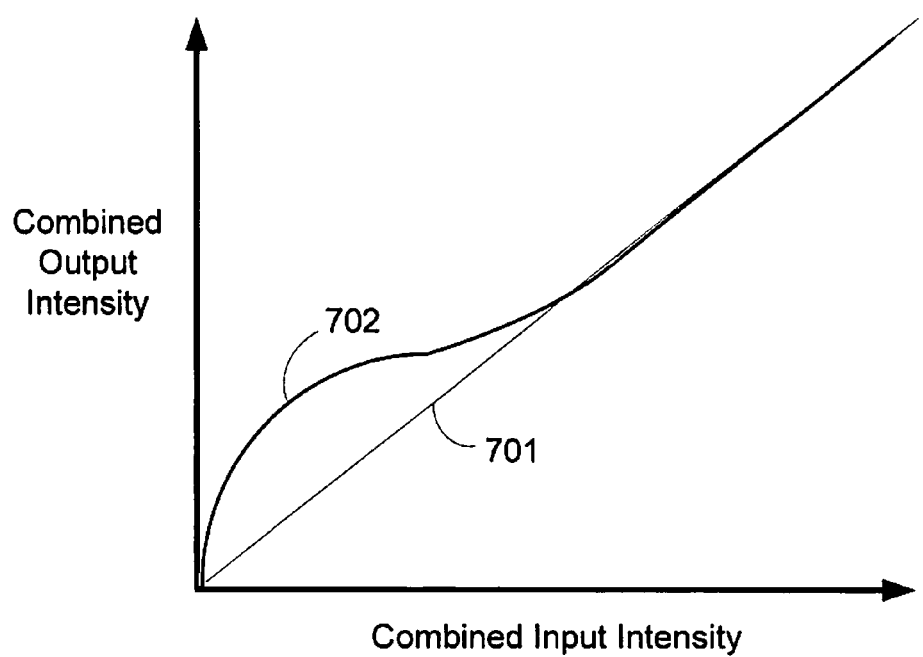
FIG. 7 is a graph illustrating the effects of dynamic range correction.

FIG. 7 illustrates an example of the effects of dynamic range correction, such as may be done by using the gain lookup table 207. Straight line 701 represents the line, G(s)=1.0, i.e., where output pixel intensity equals input pixel intensity. Curved line 702 represents an example the effect of selectively modifying the gain G(s) to increase the intensity of darker portions of an image, such as the face of a person standing in a shadow. Of course, other shaped curves could alternatively be used.

The content map 119 can be used by the DRC unit 117 in any of various ways to compute the gain values G(s). For example, in one embodiment, shown in FIG. 2A, the gain lookup table 207 contains one or more gain values G(s) for use with pixels that are part of a detected object (e.g., a face) and one or more other gain values G(s) for use with pixels that are not part of a detected object. A selection unit 209 in the DRC unit 117 selects the appropriate gain value G(s) for a given input pixel from the gain lookup table 207 according to whether or not a given input pixel is part of a detected object, as indicated by the content map 119.

Figure 2A:
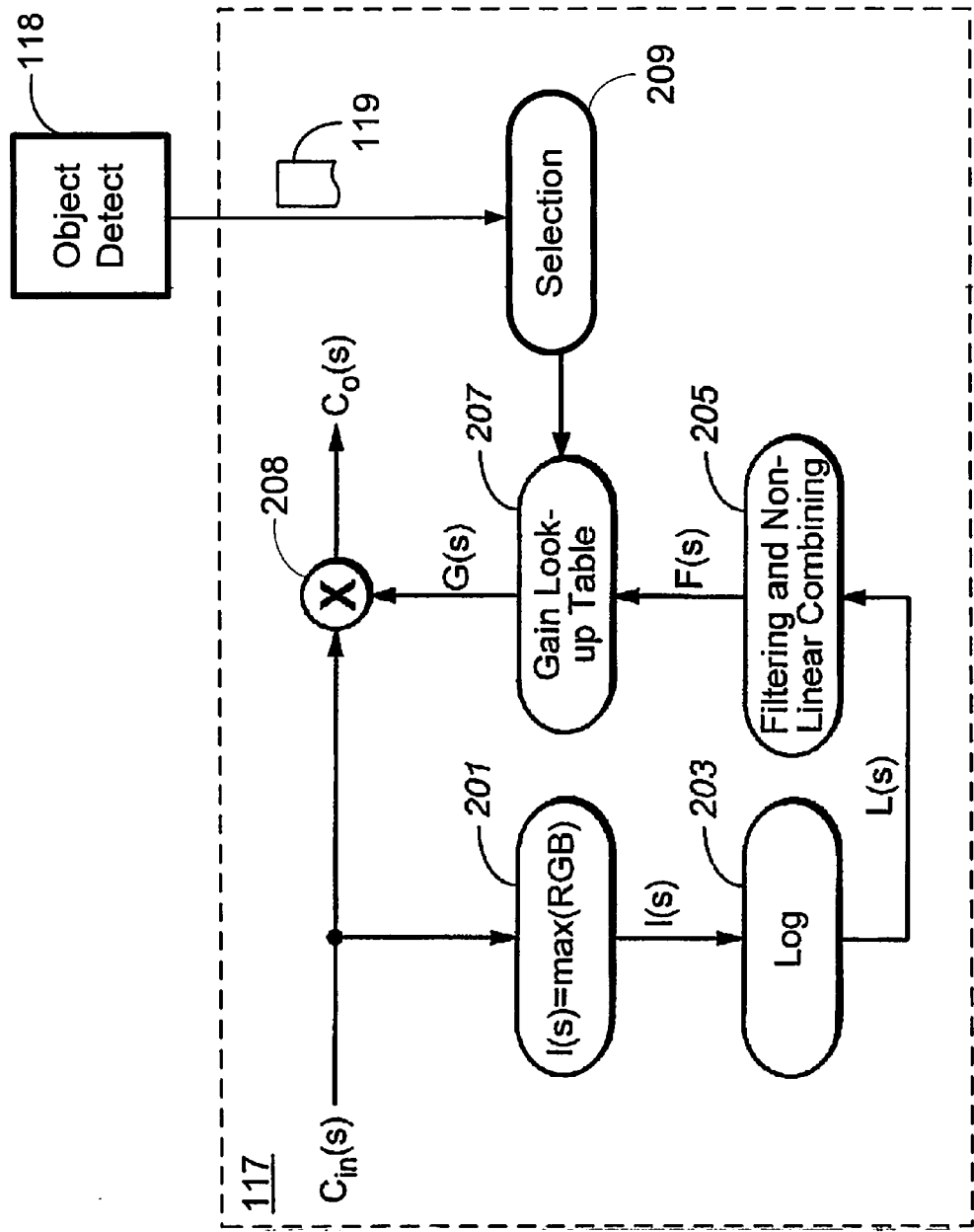
FIGS. 2A through 2D illustrate details of the DRC unit according to different embodiments.
Figure 2B:
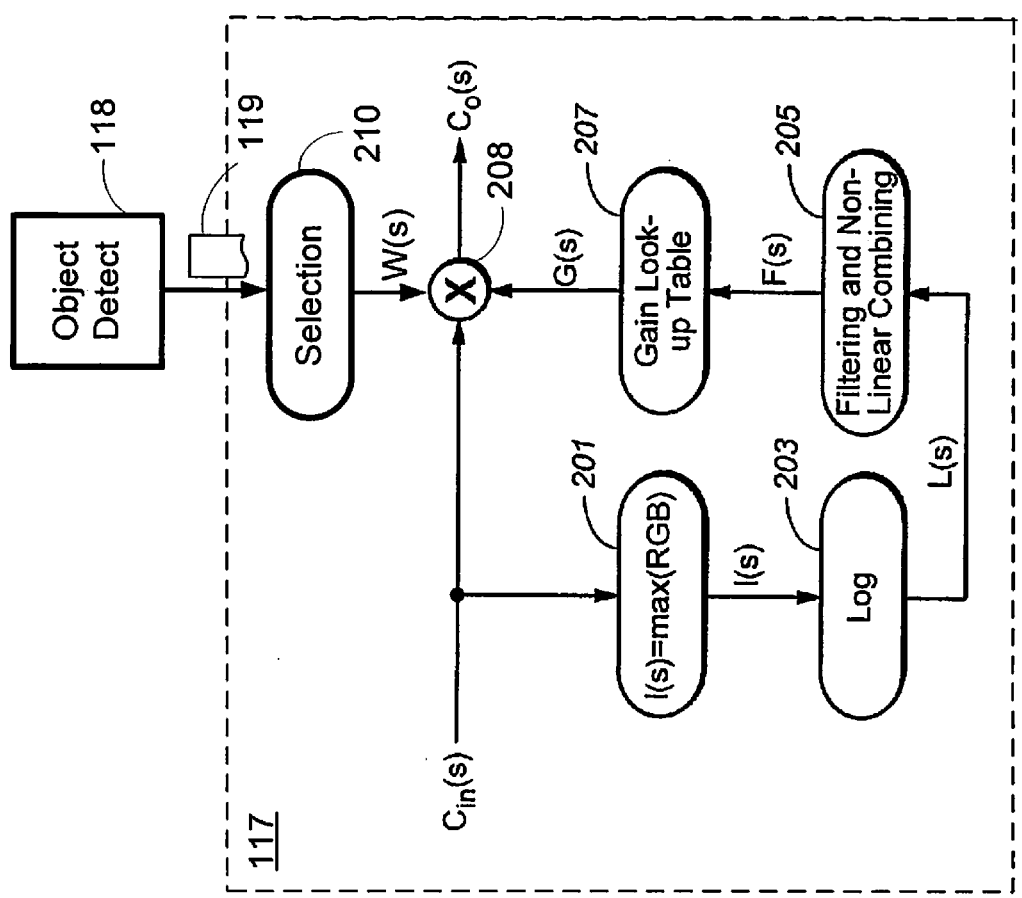

In another embodiment, shown in FIG. 2B, the DRC unit 117 uses a weighting factor W(s) (which is effectively another gain value) to modify the gain G(s) obtained/calculated from the gain lookup table 207, according to whether the input pixel is part of a detected object. This is shown in FIG. 2 as the input of the content map to weight selection unit 210, which selects the appropriate weight value W(s) and applies it to multiplier 208. This in effect amounts to editing the gain map according to the image content. For example, a greater weight value W(s) may be selected if the pixel is part of a detected object of a predetermined type (e.g., a face) than if it is not.

Figure 2C:
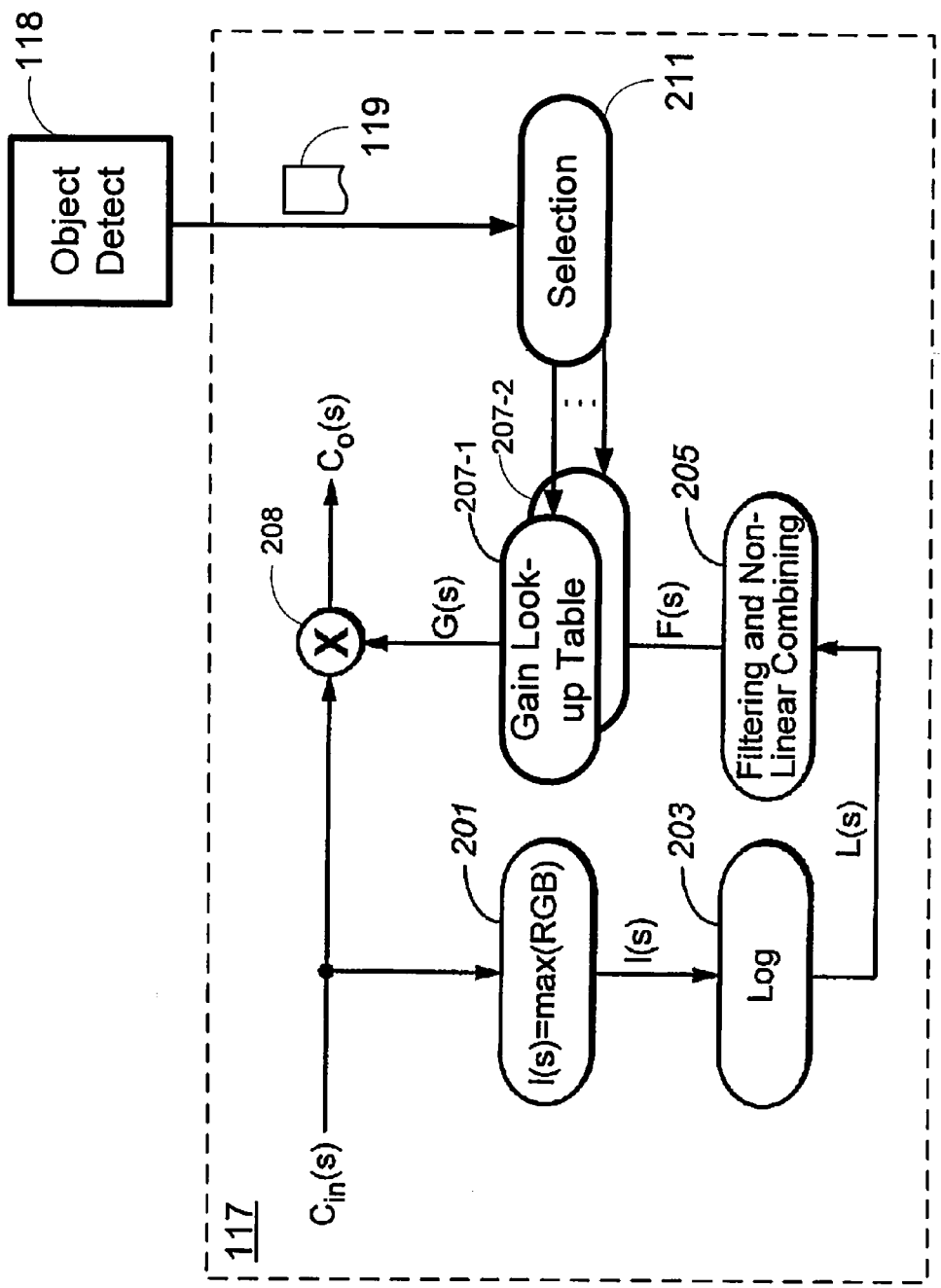

In yet another embodiment, shown in FIG. 2C, two separate gain lookup tables are provided, 207-1 and 207-2, one for use with pixels that are part of detected objects and the other for use with all other pixels, respectively. Selection unit 211 chooses a gain value from the appropriate lookup table, 207-1 or 207-2, depending on the image content, as indicated by the content map 119. In an extension of this embodiment, additional lookup tables could be provided, for example, if more than one type of object is to be detected and treated differently in the image.

Figure 2D:
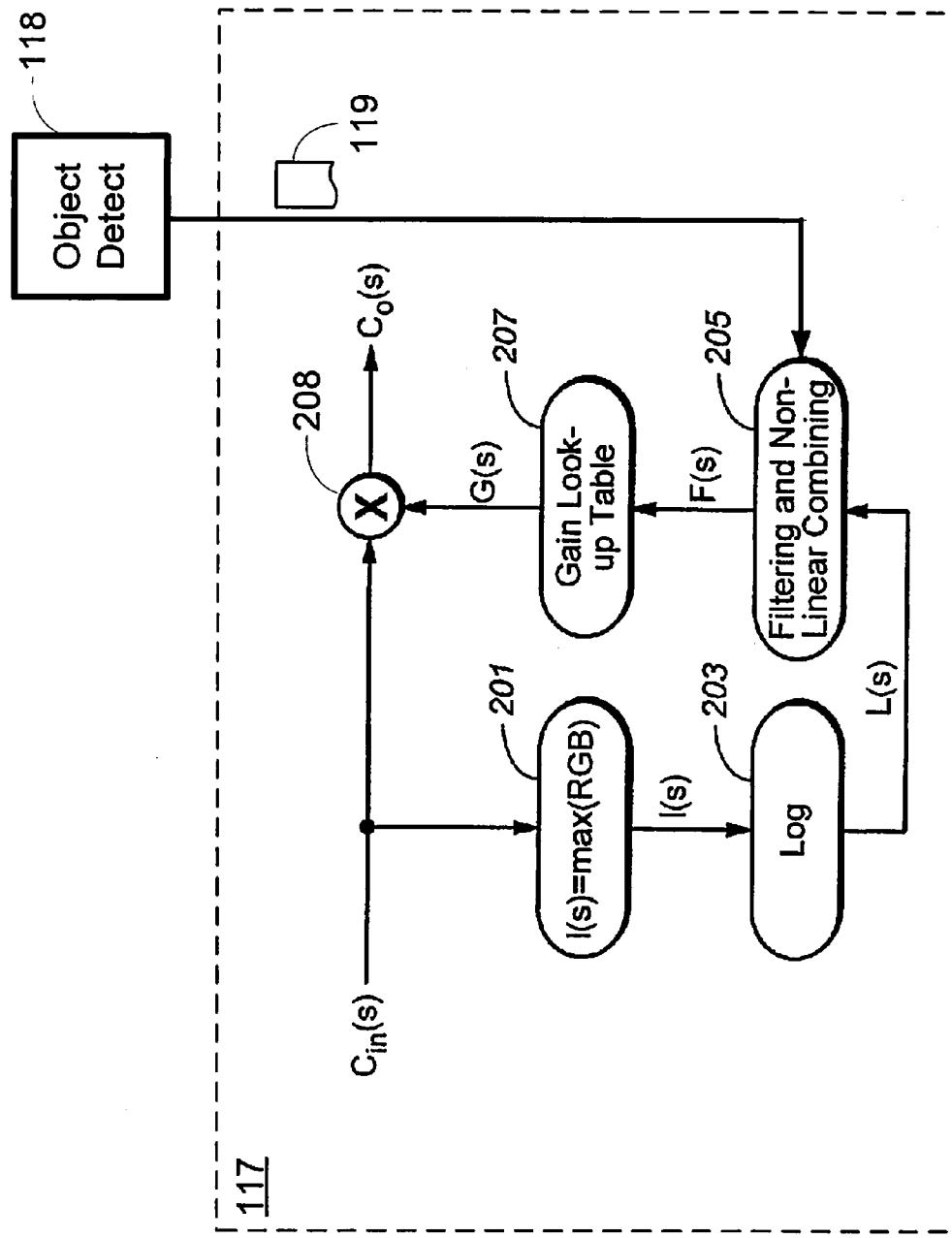

In still another embodiment, shown in FIG. 2D, the presence and location of a detected object is used to control operation of the filtering and nonlinear combining 205 for the corresponding pixels, as discussed further below.

Figure 6:
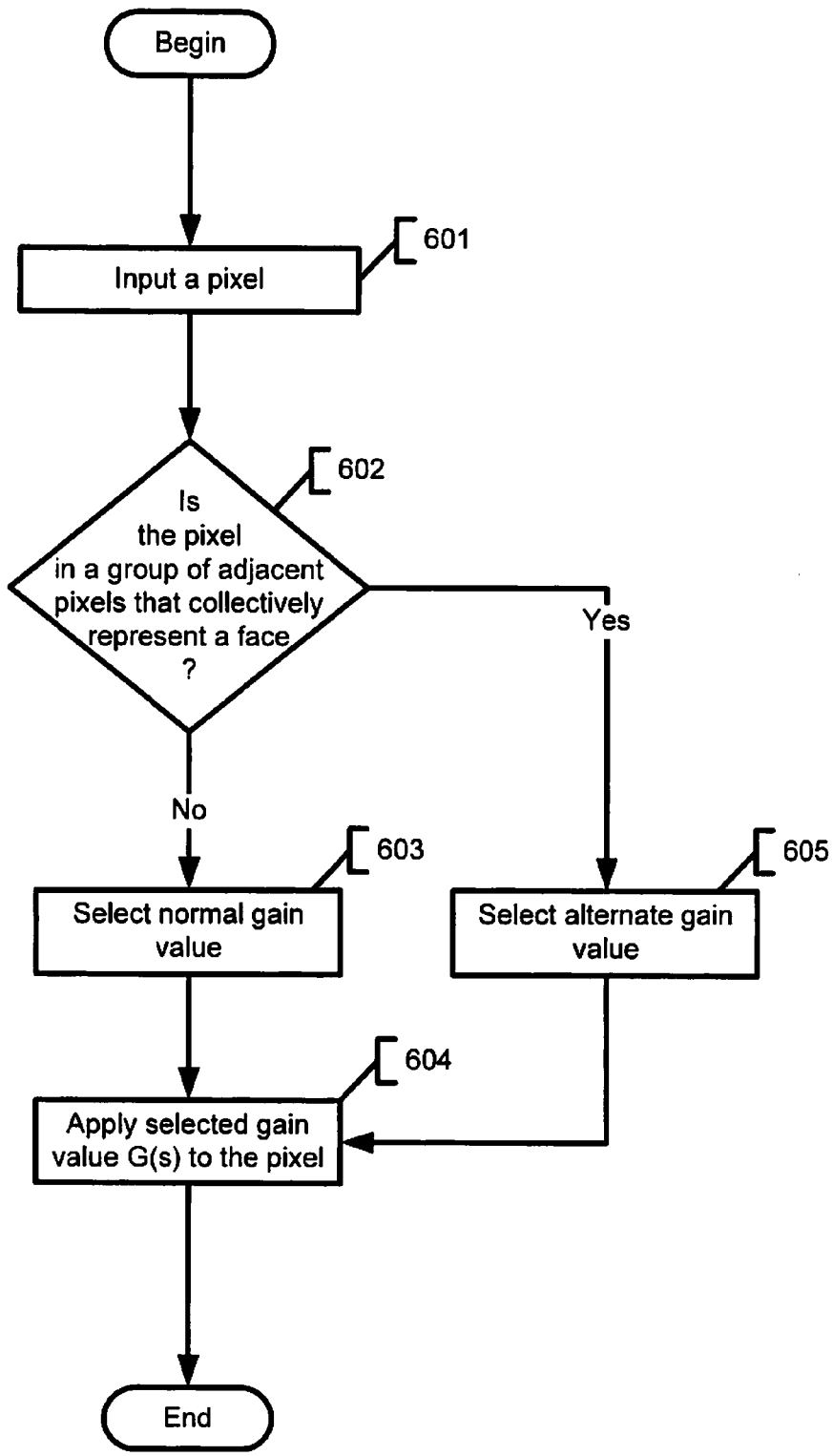
FIG. 6 is a flow diagram illustrating a process of dynamic range correction according to one embodiment.

FIG. 6 illustrates a general process that may be performed by the DRC unit 117 accordance with one embodiment of the technique introduced here. Here the example of face detection is used to facilitate description, although other types of objects could be detected in addition or instead. At step 601, the process inputs a pixel intensity value (s) (see FIG. 2) from the input image. At step 602 the process determines whether the pixel is part of a group of adjacent pixels that collectively represent a face. If the outcome of this determination is negative, then at step 603 the process selects a normal gain value G(s). If the outcome is affirmative, then the process branches to step 605, where an alternate gain value is selected. The process then applies the selected gain value, G(s), (either directly or indirectly) to the input pixel intensity value L(s) at step 604.

Figure 3:
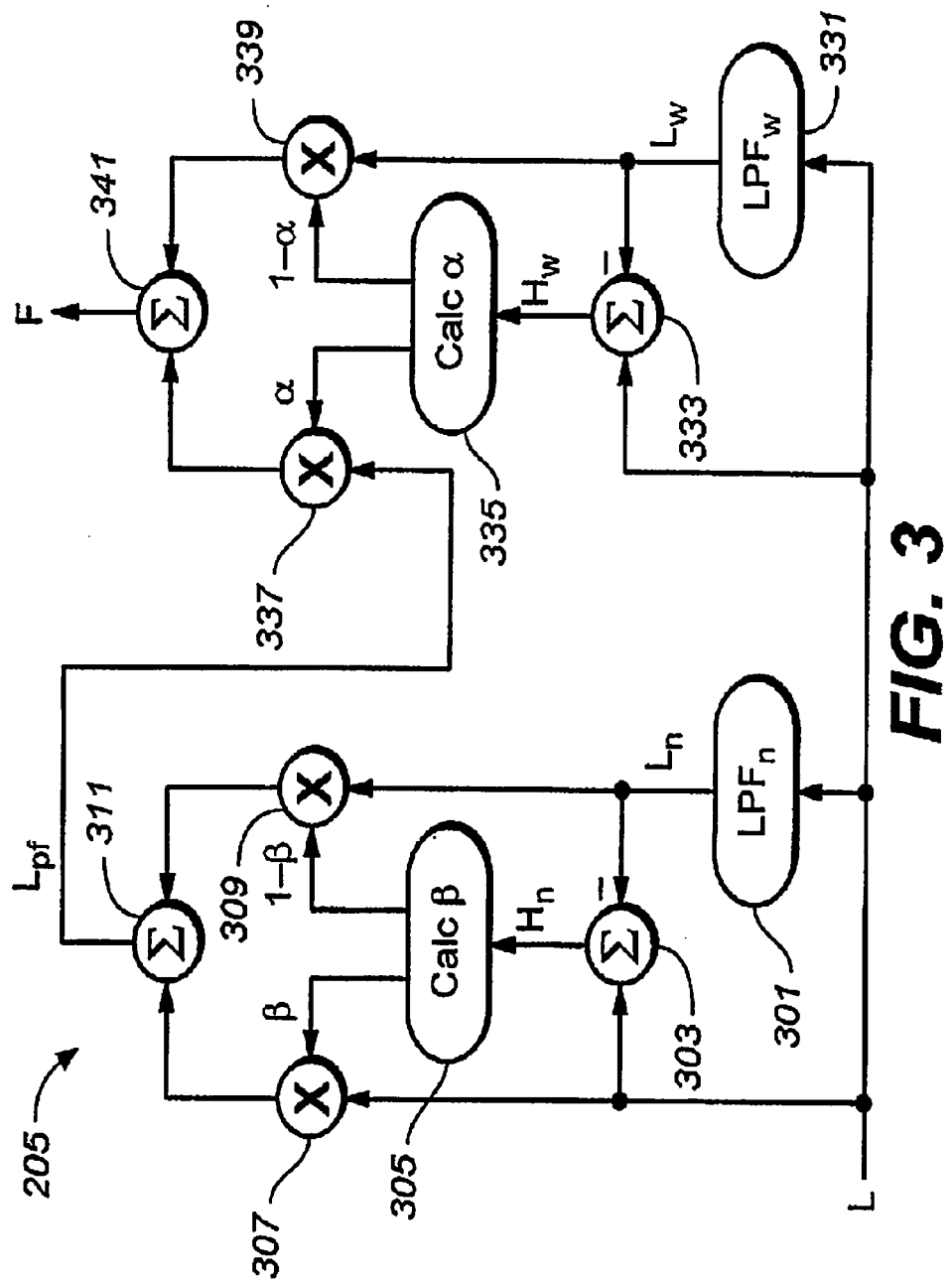
FIG. 3 illustrates details of the filtering and nonlinear combining operation according to one embodiment.

An example of filtering and non-linear processing block 205 to determine F(s) from L(s) is schematically diagrammed in FIG. 3. In this basic embodiment, L(s) is applied to two cascaded two-dimensional low-pass filters, respectively using narrow and wide neighborhoods of the pixel being treated, in order to form images $L_n$ and $L_w$. These images are formed from narrow (e.g., about 5×5 pixels) and wide window support, respectively. The width of the wide window can be dependent on the image width; for example, it could be set as a percentage (e.g., 2% or 10%) of the image width. Note that although the discussion given here is for an embodiment having at least two filter stages, single-stage embodiments can also be used for some embodiments to compute gain or chromaticity factors.

As shown in FIG. 3, L(s) is received at the first stage of the filter, where it filtered by the narrow window low pass filter ($LPF_n$) 301 to produce $L_n$. $L_n$ is then combined with L in summer 311 to form the linear combination $L_{pF}$ as output, where the coefficients of the combination are determined at 305 from Hn, the high-pass filtered of L, at summer 303 and are applied at 307 and 309. The second stage of the filter is similar to the first stage, except that the low-pass filter $LPF_w$ 331 uses the wide support window and the output F(s) is the linear combination of the low-pass filtered signal and the output of the preceding stage $L_{pF}(S)$ (hence, the cascading) instead of the input signal L(s).

More specifically, the high-pass filter images $H_n$ and $H_w$ are respectively formed in the summers 303 and 333 by subtracting $L_n$ and $L_w$ from the input signal L:

$$H_n(s)=L(s)-L_n(s);$$

$$H_w(s)=L(s)-L(s).$$

The non-linear, pixel dependent coefficients α and β are respectively extracted from the high pass filter images at 305 and 335 using nonlinear mapping functions beta($H_n$) and alpha($H_w$):

$$\beta=\text{beta}(H_n);$$

$$\alpha=\text{alpha}(H_w)$$

In a basic embodiment, the nonlinear mappings beta($H_n$) and alpha($H_w$) can be predetermined.

Finally, the cascaded output F(s) is formed by combining L with $L_n$ and $L_w$ according to the following equations:

$$F=\alpha*L_{pF}+(1-\alpha)*L_w;$$

$$L_{pF}=\beta*L+(1-\beta)*L_n;$$

where these combinations are respectively formed in summers 341 and 311.

A simple example of a possible set of non-linear functions is as follows:

$$\text{beta}(s) = \begin{cases} 0 & H_n\{s\} < ThrHnLow \\ 1 & H_n\{s\} < ThrHnHigh \\ HnSlp*\{H_n(s) - ThrHnLow\} & \text{otherwise} \end{cases}$$

where HnSlp=1/(ThrHnHigh−ThrHnLow),and $$\text{alpha}(s) = \begin{cases} 0 & H_w\{s\} < ThrHwLow \\ 1 & H_w\{s\} < ThrHwHigh \\ HwSlp*\{H_w(s) - ThrHwLow\} & \text{otherwise} \end{cases}$$

where HwSlp=1/(ThrHwHigh−ThrHwLow). In a basic embodiment the thresholds ThrHwHigh, ThrHwLow, ThrHnHigh, ThrHnLow are predetermined constants that can be set independently for each stage of the filter; more generally, the thresholds in one stage can be dependent on other stages, and these can be adaptive and responsive to image characteristics, as discussed further below.

In the example above, the coefficients are piecewise linear, being 0 below the low threshold and rising linearly to unity at the high threshold. Consequently, for smaller values of $H_n$ (below the low threshold value), β=0 and the output of the first stage will be the low-pass filtered signal $L_n$, while for values of $H_n$ over the high threshold β=1 and the output of the first stage is the same as the input, L(s). Similarly, F(s) will transition between the low pass filter $L_w$ and $L_{pF}$ as magnitude of the high pass filter value increases. More generally, other functions than the piecewise linear example, such as those with smoother transitions (e.g., sigmoid), may be implemented using a look up table or other mechanisms.

The final stage of the process (207 in FIG. 2) computes the desired gain G(s) for a pixel s by nonlinear mapping of F(s). Since the image F is an edge preserving low pass filter version of the image L, it carries information on the intensity of the pixels and its surrounding narrow and wide support. A gain lookup table ("GainLUT") can be used to implement a user predetermined non-linear function, thus:

$$G(s)=\text{Gain}LUT(F(s))$$

The amount of gain in shadow regions as well as attenuation in highlight regions is determined by the mapping of F to the lookup table content. Other correction factors besides gain, such as chromaticity (color balance), can be similarly determined. Consequently, as noted above, there may be one or more correction factors, some of which will differ for the differing color channels. Thus, for example, pixel chromaticity adjustment can be employed to effect greater visualization of detail in the final image, in conjunction with, or separately from, pixel gain adjustment.

Figure 4:
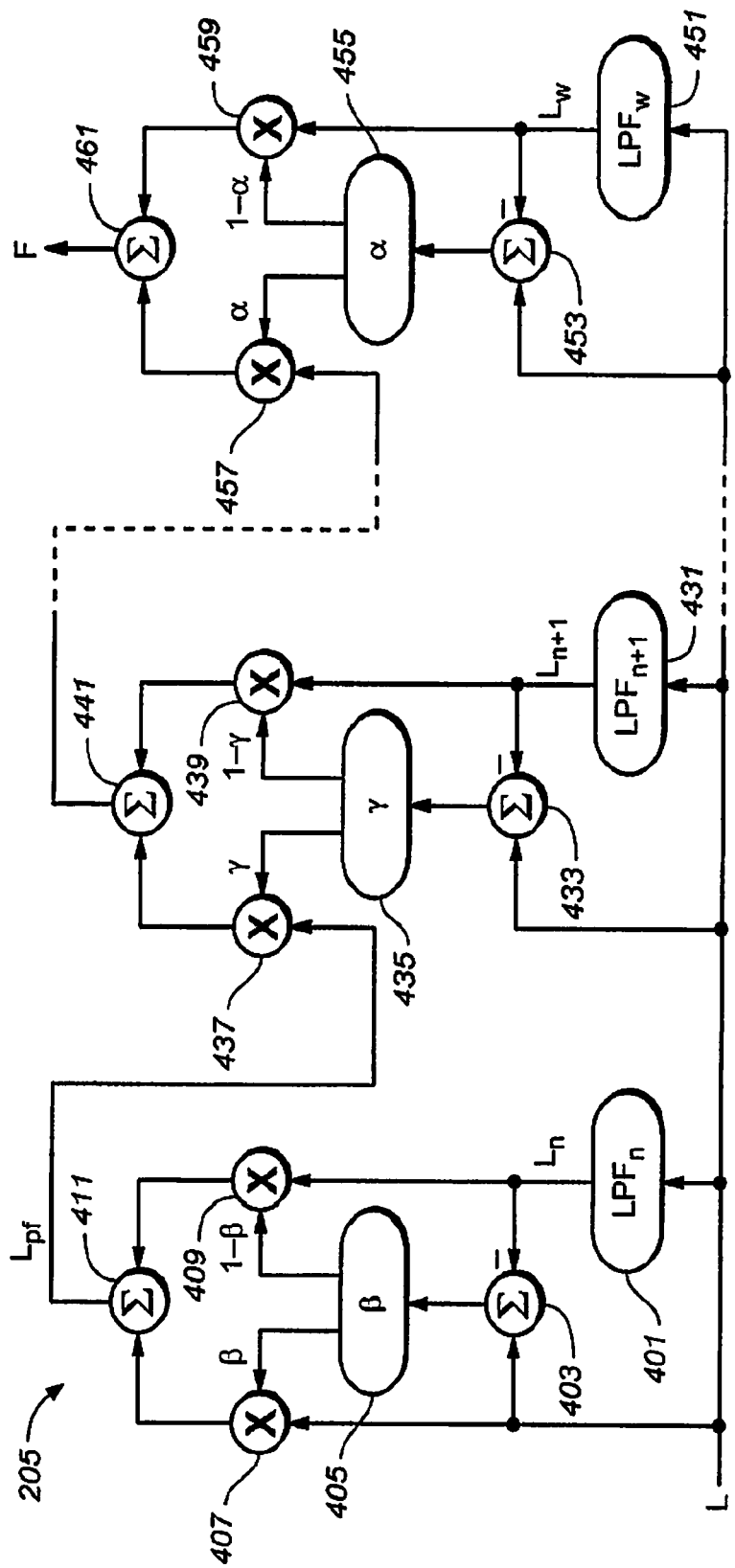
FIG. 4 shows a more general embodiment of the filtering and nonlinear combining operation.

FIG. 4 is an embodiment that incorporates one or more additional cascaded stages between the initial stage (the stage with the narrowest support window) and the last stage (the stage with the widest support window). The use of these successively larger neighborhoods about the pixel fills the gap between $L_n$ and $L_w$ with additional low-pass filter sections to obtain finer edge preserving transition by cascading additional sections. The width of these windows may be set in various ways. For example, as noted above, the narrow window could be set at, say, about 5×5 pixels, with the width of the wide window dependent upon the image width. These widow sizes may be user determined, or in a more general case, they may be dependent on the content of the image. Some measures that may be used for this are discussed below.

In each section of the cascade, depicted in FIG. 3 or 4 above, a weighting factor (for example β in the section furthest to left in FIG. 4) controls the combination between the section input L and output from its low-pass filter version Ln. The weighting factor depends on its thresholds, ThrHnLow, ThrHnHigh, with ThrHnLow<=ThrHnHigh. In the basic embodiment described above, these thresholds were preset. More generally, these thresholds, and the determination of the weighting factors in general, can be made adaptive and responsive to the characteristics of the image, including based on the detection of predetermined types of objects (e.g., faces) it in the image. In the following description the first section (with narrow support filter) is used as an example. For sections n>1, the input to section n is the output of section n−1 and L, which is the input to the section filter.

When the high pass filter data (HPF), which is the difference between the input (L) and filtered data (Hn=L−Ln), is below the low threshold (beta=0), the output of the section, LpF=beta*Hn+Ln, coincides with the filtered data (LpF=Ln). When the high pass filter data (HPF) is above the high threshold (that means beta=1), the output coincides with the section input (LpF=L).

The low and the high thresholds may be related to Hn. Examples may include the minimum, maximum, mean, median, standard deviation or other statistical measures taken from a histogram of the whole image or within a sub-image block. For example, one embodiment can set the low and the high thresholds with respect to the minimum and the maximum of Hn, respectively, mathematically represented as:

$$ThrHn\text{Low}=k1*\min(Hn),\text{and}$$

$$ThrHn\text{High}=k2*\max(Hh),$$

with, for example, k1=k2=0.5, so that the dynamic range of the blending process may be adapted to the image characteristics.

In another set of embodiments, the image statistics may be better expressed by moments of distribution. For example, in a normal distribution the statistics may be sufficiently expressed by the first two moments, namely the mean and the standard deviation (std). Using this approach, the thresholds may be set as:

$$ThrHnLow = mean(Hn) - k1*std(Hn), and$$

$$ThrHnHigh = mean(Hn) + k2*std(Hn).$$

In addition, the thresholds may be used to adaptively control the contribution of each section. For example, by setting ThrHnLow<=ThrHnHigh=min(Hn), the section is adaptively bypassed (LpF=L), since Hn>=ThrHnHigh. Similarly, when ThrHnLow=max(Hn), the section uses the filtered data (LpF=Ln).

The mean and standard deviation of Hn may be extracted for the whole image, such as from a result of a preprocessing stage. In another embodiment, an estimate of these values may be taken either from a preview image (at a smaller scale), or a previous image in a sequence of images. Another alternative is to use local mean and standard deviation extracted from a sub-image block of pixels in the neighborhood of the current pixel.

The general embodiment of FIGS. 3 and 4 can include two or more cascaded stages. The particular number of active sections in the cascade can be adaptively selected using measurements from the whole image or from sub image block, so that a number sections ranging from one to all of the available sections are applied to the image. In the exemplary embodiments, each section contains a linear filter whose window support length increases with the section number; that is, again referring to FIG. 4, the LPF of section n+1 has larger support than LPF of section n. Since a narrow support filter can track changes more locally then a filter with wider support, the local contrast may be controlled by selectively using various sections in cascade.

In addition to detecting predetermined types of objects, various spatial measurements may also be used to characterize the image content. The location(s) of a predetermined type of object and/or these spatial measurements (which can be taken together with a user preference for the amount of local contrast needed) can be used to adaptively determine which and how many sections will be used. Examples of such spatial measurements may include, for example:

1) The local magnitude of one or more of the high-pass filters (e.g. Hn) and its sign may help to measure local edges and their direction (rising or falling edge) within the image or some sub-image block. In this case measurements are taken locality with relation to the support of the section filter.

2) Spatial frequencies as obtained from the image or sub image block, by frequency domain tools such as Discrete Cosine Transforms (DCT). A spatial frequency is detected in the image or sub image block when its coefficient is above a given threshold.

Figure 8A:
FIG. 8A shows an image and corresponding brightness histogram for a case with no dynamic range correction applied.
Figure 8A:
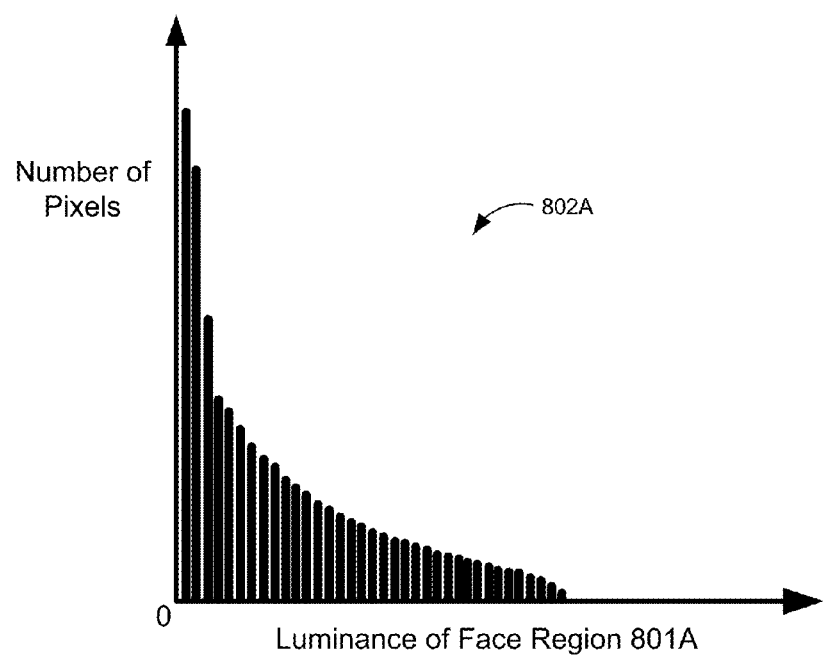
Figure 8B:
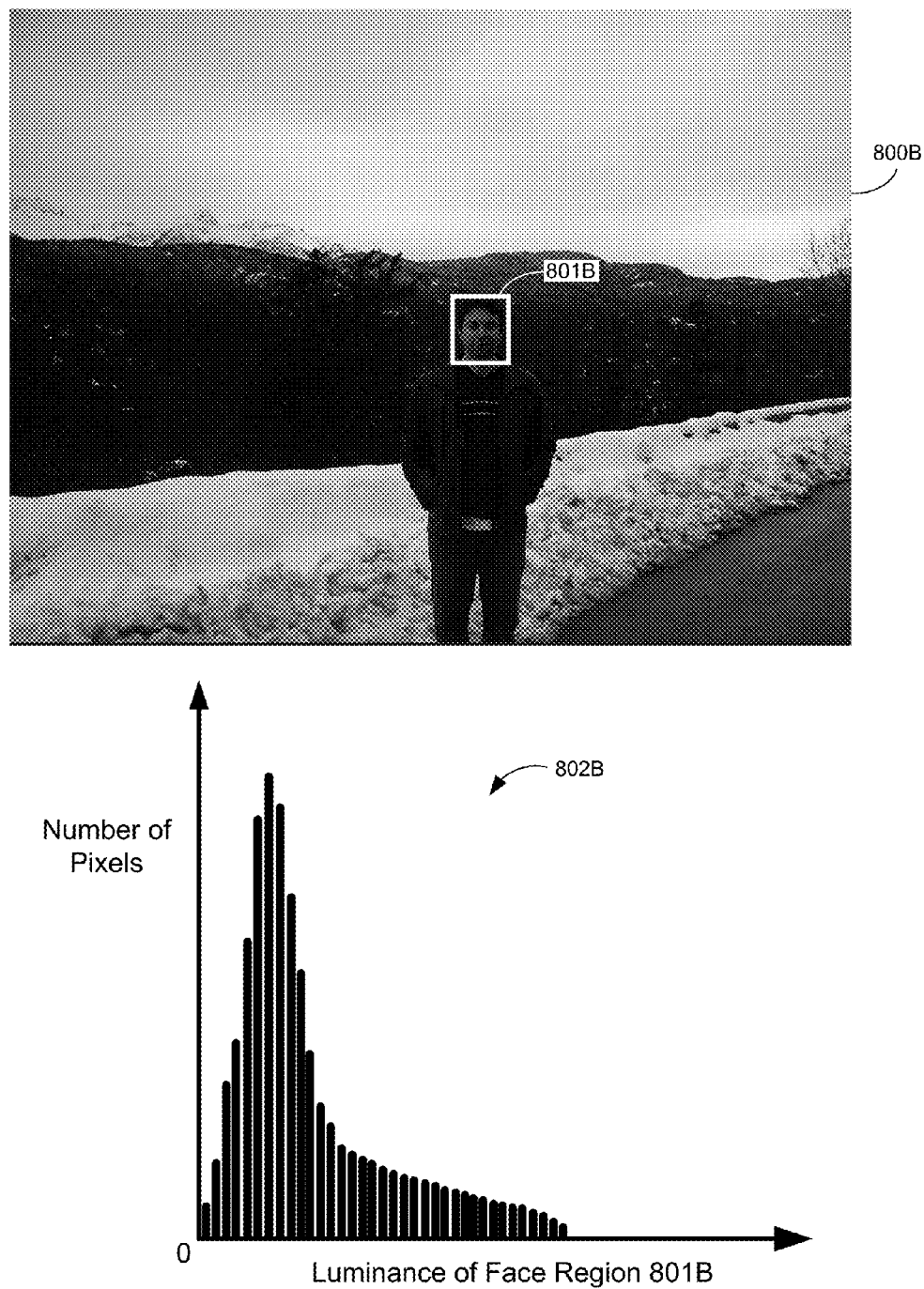
FIG. 8B shows an image and corresponding brightness histogram for a case with dynamic range correction applied without knowledge of image content.
Figure 8C:
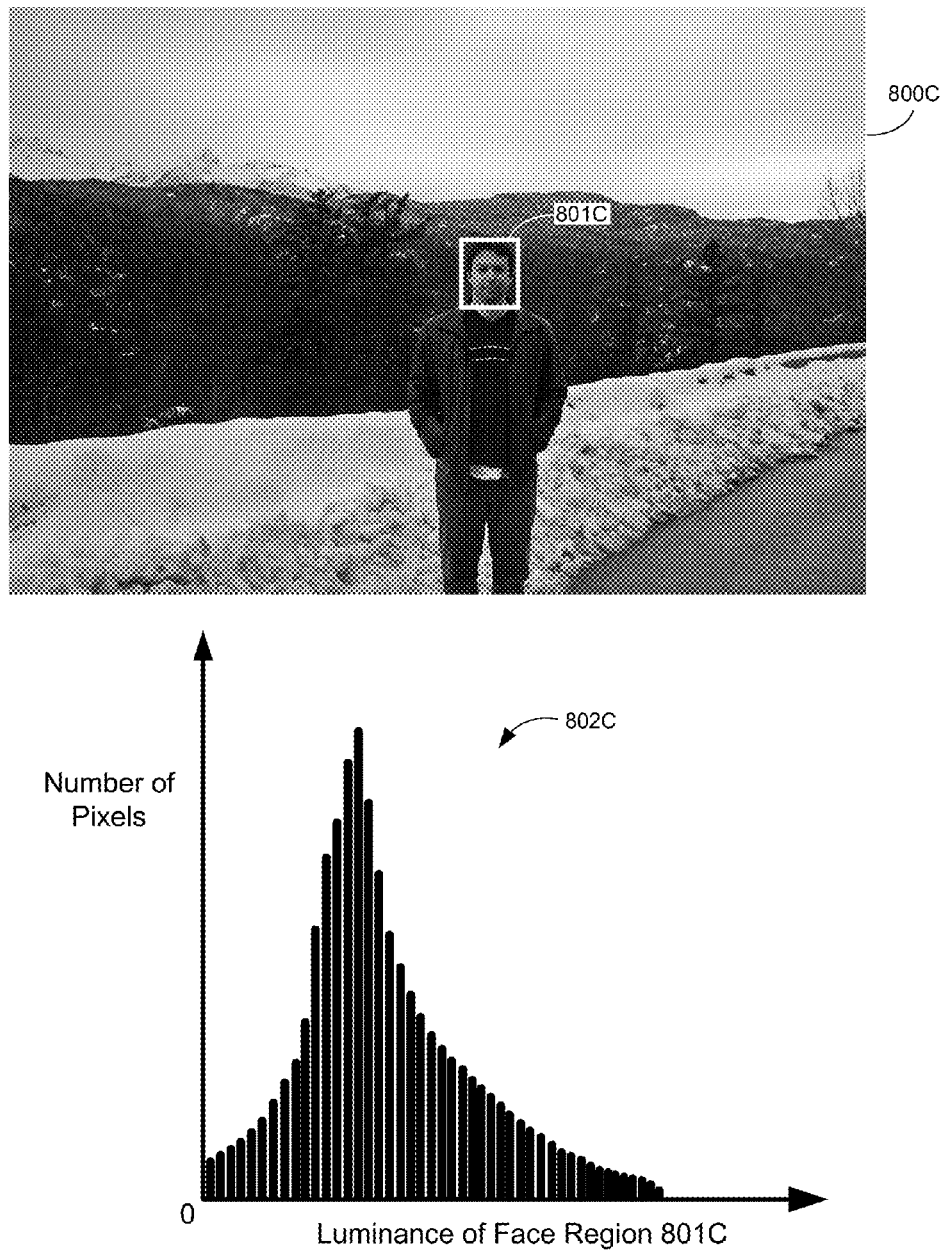
FIG. 8C shows an image and corresponding brightness histogram for a case with dynamic range correction applied based on knowledge of image content.

FIGS. 8A through 8C illustrate an example of how image quality can be improved by use of content-based DRC as introduced above. Specifically, FIG. 8A shows an example of an image 800A with no dynamic range correction applied. As can be seen, the face area 801A in image 800A is hardly recognizable; it is too dark, in contrast to the sky and the snow bank in the background, due to the camera that acquired the image 800A having insufficient dynamic range.

Histogram 802A indicates the distribution of luminance (brightness) levels for pixels in the face area 801A. It can be seen that the histogram is concentrated at luminance values close to zero (black level).

FIG. 8B shows an example of the same image after dynamic range correction is applied without knowledge of the content of the image; that is, dynamic range correction is applied uniformly across the image. While there is a mild improvement to the brightness of the face area 801B in image 800B relative to image 800A, it is still not optimal, since the dynamic range correction algorithm has no information about the importance of the face.

Histogram 802B indicates the distribution of luminance levels for pixels in the face area 801B in FIG. 8B. It can be seen that the peak of histogram 802B has moved somewhat to the right, relative to histogram 802A, however, histogram 802B is still skewed toward the left (low luminance values). This reflects the fact that face area 801B in FIG. 8B is brighter than face area 801A in FIG. 8A, yet it is still too dark in the opinion of some viewers.

FIG. 8C shows an example of the same image after dynamic range correction is selectively applied based on knowledge of the content of the image (i.e., based on the presence and location of the face area 801C in this example), according to the technique introduced here. As can be seen, the face area 801C in image 800C is much brighter than in the previous two images.

Histogram 802C indicates the distribution of luminance levels for pixels in the face area 801C in FIG. 8C. It can be seen that the peak of histogram 802B has been shifted further to the right, relative to histograms 802A and 802B, such that it is much more evenly distributed across the range of luminance levels. This reflects the more optimal brightness level of face area 801C.

Figure 5:
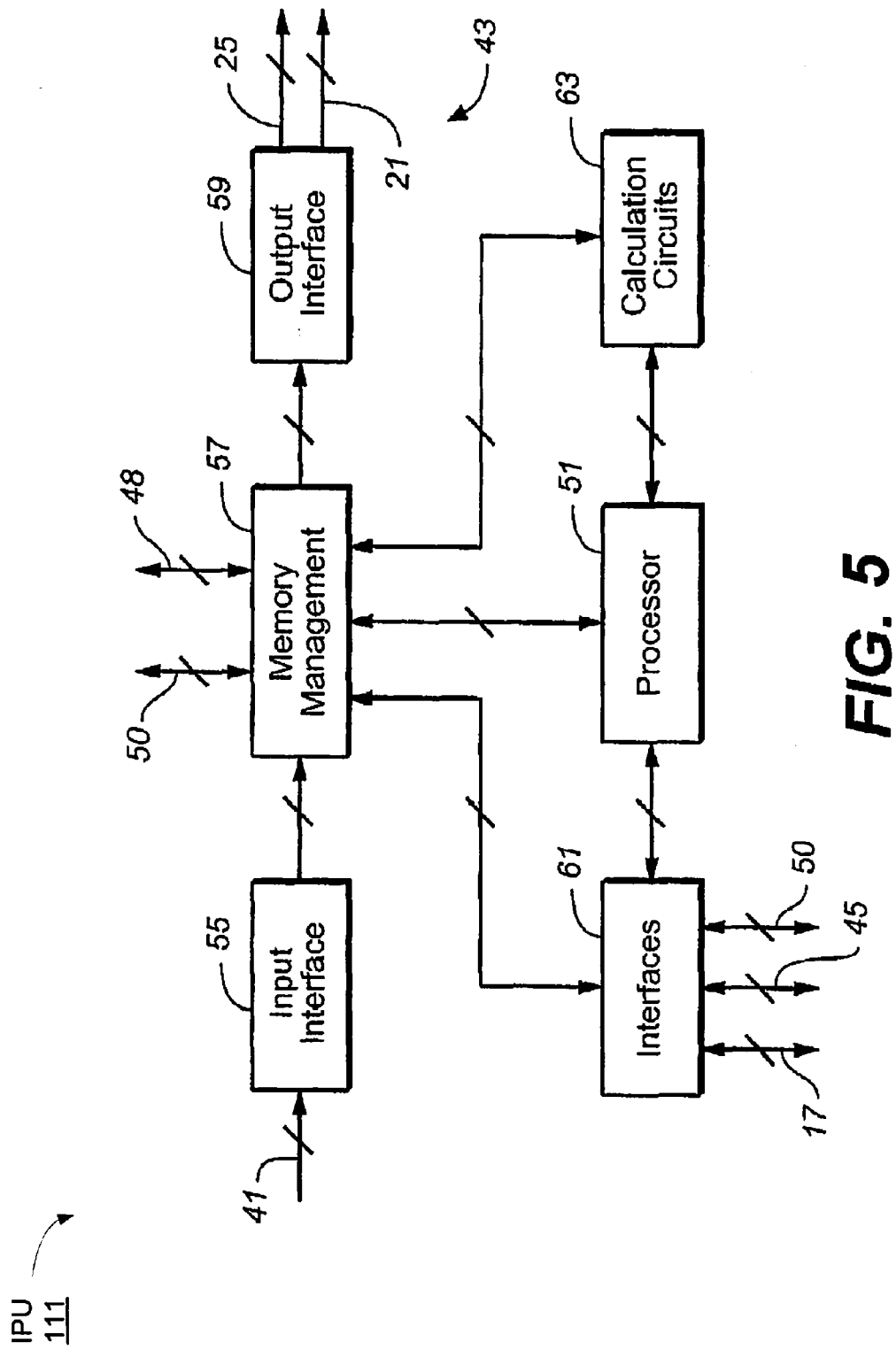
FIG. 5 shows the elements of the image processing unit (IPU) of FIG. 1 according to one embodiment.

FIG. 5 shows a general block diagram of the IPU 111, according to one embodiment. As illustrated, the IPU 111 includes a processor 51, input interface circuit 55, memory management unit 57, output interface circuit 59, interface circuits 61 and calculations circuits 63. The processor 51, which may be a general-purpose processor or specially designed to perform the tasks described herein, performs calculations on the image data and controls operation of the image processing system in which it is included. In some embodiments this may be in response to software or firmware stored in a memory. Input digital image data are received over lines 41 by interface circuit 55 through input contacts on the IPU 111, and are then communicated with other system components by connection through memory management unit 57. Image data are output through interface circuit 59 to lines 21 and 25 (e.g., to a memory) that are connected to output contacts on IPU 111. Interface circuits 61 communicate between the lines 17, 45 and 50 and the processor 51 and memory management unit 57.

Circuits 63 of FIG. 5, which are also connected with the processor 51 and memory management unit 57, are optionally included to do at least some of the calculations necessary to carry out the data processing that is performed by the image processing system. The processor 51 may make all the calculations under control, but the use of dedicated circuits 63 to at least make the most repetitive and/or complex calculations may be preferred.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   determining whether a first portion of digital image data represents a physical object of a predetermined type;
   determining a correction to apply to the first portion of the digital image data, based on a determination that the first portion of the digital image data represents a physical object of the predetermined type, wherein the determined correction is matched to the predetermined type;
   applying the determined correction to the first portion of the digital image data to enhance a visual characteristic of the first portion of the digital image data, by applying a first amount of the correction to the first portion of the digital image data; and
   applying a second amount of the correction to a second portion of the digital image data, wherein the first amount differs from the second amount, and wherein the first amount corresponds to a physical object of the predetermined type.

2. A method as recited in claim 1, wherein the correction comprises a dynamic range correction.

3. A method as recited in claim 1, wherein determining the correction comprises determining an amount of a parameter to apply to the first portion of the digital image data.

4. A method as recited in claim 3, wherein the parameter is a gain.

5. A method as recited in claim 1, wherein applying the determined correction to the first portion of the digital image data comprises applying a first amount of a parameter to the first portion to enhance the visual characteristic, wherein the first amount of the parameter is different from a second amount of the parameter applied to a second portion of the digital image data, resulting in a first portion of a digital image that corresponds to the first portion of digital image data being brighter than if the second amount of the parameter were applied to both the first portion and the second portion of the digital image data.

6. A method as recited in claim 1, wherein the predetermined type of physical object represents facial attributes.

7. A method as recited in claim 1, further comprising:
   determining that the second portion of the digital image data does not represent a physical object of the predetermined type; and
   determining a different amount of gain to apply to the second portion than an amount of gain determined for the first portion.

8. A method as recited in claim 7, wherein determining the amount of gain to apply to the first portion of the digital image data comprises:
   determining the amount of gain to apply to the first portion of the digital image data so as to maintain local contrast of the first portion of the digital image data.

9. A method as recited in claim 7, wherein the first portion of the digital image data includes a plurality of pixels, and wherein determining the amount of gain to apply to the first portion of the digital image data comprises:
   determining a first intermediate value based on a measure of image strength of a first pixel within the first portion of the digital image data;
   determining a second intermediate value based on a measure of image strength of a plurality of pixels surrounding the first pixel in the digital image data; and
   using the first intermediate value and the second intermediate value to determine the amount of gain to apply to the first portion of the digital image data.

10. A method as recited in claim 9, wherein determining the first intermediate value and determining the second intermediate value each separately comprise applying a low pass filter function.

11. A method as recited in claim 7, wherein determining the amount of gain to apply to the first portion of the digital image data comprises:
    selecting a value from a gain data structure according to whether the first portion of the digital image data represents a physical object of the predetermined type.

12. A method as recited in claim 7, wherein determining the amount of gain to apply to the first portion of the digital image data comprises:
    determining a first gain based on the determination that the first portion of the digital image data represents a physical object of the predetermined type; and
    wherein applying the determined amount of gain comprises applying the first gain to a pixel value from the first portion of the digital image data and a second gain, wherein the second gain is independent of the determination that the first portion of the digital image data represents a physical object of the predetermined type.

13. A method as recited in claim 7, wherein determining the amount of gain to apply to the first portion of the digital image data comprises:
    modifying a gain map based on the determination that the first portion of the digital image data represents a physical object of the predetermined type; and
    wherein applying the determined amount of gain to apply to the first portion of the digital image data comprises obtaining the amount of gain to apply to the first portion of the digital image data from the gain map.

14. A method as recited in claim 7, wherein determining the amount of gain to apply to the first portion of the digital image data comprises:
    selecting one of a plurality of data structures of gain values, from which to obtain a gain value, according to whether the first portion of the digital image data represents a physical object of the predetermined type.

15. A method comprising:
  making a determination, in a digital image processing device, that a first group of adjacent pixels in a digital image represents a face;
  determining, in the digital image processing device, a type or amount of dynamic range correction to apply to at least one pixel in the first group of adjacent pixels based on the determination that the first group of adjacent pixels represents a face, wherein said determining includes determining a different amount of gain for the first group of pixels than that determined for a second group of pixels which do not represent a face, wherein said determining further includes determining the amount of gain for the first group of adjacent pixels so as to maintain local contrast of the first group of adjacent pixels, and wherein said determining further includes
    determining a first intermediate value based on a measure of image strength of a first pixel of the first group of adjacent pixels;
    determining a second intermediate value based on a measure of image strength of a plurality of pixels surrounding the first pixel; and
    using the first intermediate value and the second intermediate value to determine the type or amount of gain;
  applying the determined type or amount of dynamic range correction to the at least one pixel in the first group of adjacent pixels;
  determining that a second group of pixels in the digital image does not represent a face; and
  determining a different type or amount of dynamic range correction to apply to the second group of pixels than that determined for the first group.

16. A method as recited in claim 15, wherein determining the first intermediate value and determining the second intermediate value each separately comprise applying a low pass filter function.

17. A method as recited in claim 15, wherein determining a type or amount of dynamic range correction to apply to at least one pixel in the first group of adjacent pixels comprises:
  selecting a value from a gain data structure according to whether the at least one pixel is part of a portion of image data that represents a physical object of the predetermined type.

18. A method as recited in claim 15, wherein determining a type or amount of dynamic range correction to apply to at least one pixel in the first group of adjacent pixels comprises:
  determining a first gain based on the determination that the at least one pixel represents a physical object of the predetermined type; and
  wherein applying the determined type or amount of dynamic range correction comprises applying the first gain to a pixel value from the first portion of the digital image data and a second gain, wherein the second gain is independent of the determination that the first portion of the digital image data represents a physical object of the predetermined type.

19. A method as recited in claim 15, wherein determining a type or amount of dynamic range correction to apply to at least one pixel in the first group of adjacent pixels comprises:
  modifying a gain map based on the determination that the first portion of the digital image data represents a physical object of the predetermined type; and
  wherein applying the determined type or amount of dynamic range correction comprises obtaining the amount of gain from the gain map.

20. A method as recited in claim 15, wherein determining a type or amount of dynamic range correction to apply to at least one pixel in the first group of adjacent pixels comprises:
  selecting one of a plurality of data structures of gain values, from which to obtain a gain value, according to whether the at least one pixel is part of a portion of image data that represents a physical object of the predetermined type.

21. An image processing unit comprising:
  an object detection unit to receive an intensity value for each of a plurality of pixels in a set of digital image data and to determine that a first portion of the set of digital image data represents a physical object of a predetermined type; and
  a correction unit to determine a type or amount of correction to apply to the first portion of the set of digital image data, based on an output of the object detection unit, and to apply the determined type or amount of correction to the first portion of the set of digital image data, and to apply a different type or amount of correction to a second portion of the set of digital image data which does not represent a physical object of the predetermined type.

22. An image processing unit as recited in claim 21, wherein the correction is a dynamic range correction.

23. An image processing unit as recited in claim 22, wherein the object detection unit is configured to detect faces.

24. An image processing unit as recited in claim 21, wherein the correction unit further is to:
  determine that a second portion of the set of digital image data does not represent a physical object of the predetermined type; and
  determine a different type or amount of correction to apply to the second portion than that determined for the first portion.

25. An image processing unit as recited in claim 21, wherein the correction unit comprises:
  a filter unit which receives the intensity values of the plurality of pixels and which includes a plurality of cascaded filter stages, wherein at least one filter stage of the plurality of cascaded filter stages operates based on a larger pixel neighborhood than a preceding filter stage of the plurality of cascaded filter stages, and wherein the image processing unit determines a number of stages of the filter unit that are active based on the set of digital image data;
  wherein the correction unit corrects intensity values of the plurality of pixels based on outputs of the filter unit.

26. An image processing unit as recited in claim 21, wherein the correction unit determines an amount of gain to apply to the first portion of the digital image data by determining the amount of gain so as to maintain local contrast of the first portion of the digital image data.

27. An image processing unit as recited in claim 26, wherein determining the amount of gain to apply to the first portion of the digital image data comprises:
  selecting a value from a gain data structure according to whether the first portion of the digital image data represents a physical object of the predetermined type.

28. An image processing unit as recited in claim 26, wherein the first portion of the digital image data includes a plurality of pixels, and wherein determining the amount of gain to apply to the first portion of the digital image data comprises:
  determining a first intermediate value based on a measure of image strength of a first pixel within the first portion of the digital image data;

determining a second intermediate value based on a measure of image strength of a plurality of pixels surrounding the first pixel in the digital image data; and using the first intermediate value and the second intermediate value to determine the amount of gain.

29. An image processing unit as recited in claim 28, wherein determining the first intermediate value and determining the second intermediate value each separately comprise applying a low pass filter function.

30. An image processing unit as recited in claim 26, wherein determining the amount of gain to apply to the first portion of the digital image data comprises:

modifying a gain data structure based on the determination that the first portion of the digital image data represents a physical object of the predetermined type; and wherein applying the determined amount of gain comprises obtaining the amount of gain from the gain data structure.

31. An image processing unit as recited in claim 26, wherein determining the amount of gain to apply to the first portion of the digital image data comprises:

determining a first gain based on the determination that the first portion of the digital image data represents a physical object of the predetermined type; and wherein applying the determined amount of gain comprises applying the first gain to a pixel value from the first portion of the digital image data and a second gain, wherein the second gain is independent of the determination that the first portion of the digital image data represents a physical object of the predetermined type.

32. An image processing unit as recited in claim 26, wherein determining the amount of gain to apply to the first portion of the digital image data comprises:

selecting one of a plurality of data structures of gain values, from which to obtain a gain value, according to whether the first portion of the digital image data represents a physical object of the predetermined type.

33. An apparatus comprising:

means for making a determination that a first group of adjacent pixels in a digital image represents a physical object of a predetermined type;

means for determining a type or amount of dynamic range correction to apply to at least one pixel in the first group of adjacent pixels based on the determination that the first group of adjacent pixels represents a physical object of the predetermined type;

means for applying the determined type or amount of dynamic range correction to the at least one pixel in the first group of adjacent pixels, by applying a first amount of the correction to the first portion of the digital image data; and means for applying a second amount of the correction to a second portion of the digital image data, wherein the first amount differs from the second amount, and wherein the first amount corresponds to a physical object of the predetermined type.

* * * * *